United States Patent Office 3,258,425
Patented June 28, 1966

1

3,258,425
LUBRICANTS

Oliver W. Burke, Jr., 506 Intracoastal Drive, Fort Lauderdale, Fla.

No Drawing. Filed Apr. 16, 1965, Ser. No. 448,848
12 Claims. (Cl. 252—17)

This application is a continuation-in-part of my U.S. application Serial No. 853,998 filed November 19, 1959, and of my U.S. application Serial No. 538,728 filed October 5, 1955, each of which is now abandoned.

This invention relates to new and improved lubricants including particularly but not exclusively bodied lubricants embraced by the term "greases." More particularly this invention pertains to lubricant compositions containing organic fillers.

Since 1940 unprecedented needs have developed for oils, hydraulic fluids and greases capable of lubricating bearings, gears and mechanisms at new extremes of temperature, at higher speeds, and under greater loads. Mechanical equipment has to be operated through rapid changes of climate in the air and on the ground. This led to problems of transportation, hence lubrication, under very extreme condition of temperature, humidity, rain and snow, including exposure to all kinds of tropical deterioration.

It is well known that lubricants generally lose some or all of their effectiveness when subjected to high temperature and pressure conditions and this is particularly true of greases exposed to such conditions. For example, certain soda base greases have a pronounced and undesirable property of changing their structure with temperature change from that of a short fibre to a long fibre. Other greases have a tendency to soften at elevated temperatures and others lose their oil content or "bleed" too rapidly at elevated temperatures. Further certain greases are affected by moisture and may even be somewhat abrasive.

I have found that lubricants and greases can be prepared from vinylic fillers, as herein defined, which are structurally stable, which do not soften with temperature elevations, which have the desirable controlled retention of lubricating fluid, which are not in general affected by moisture and which are not abrasive.

The invention, therefore, provides lubricating compositions comprising a lubricant and a vinylic filler as herein defined.

DEFINITIONS

The term "vinylic filler" as used herein designates the homopolymerization and the multi-polymerization products and interpolymers including graft interpolymers, in the form of substantially rigid colloidal sized in the range of 0.015 to 0.5 micron particles, obtainable by polymerization, in aqueous dispersions, of polymerizable substances containing one or more polymerizable unsaturated linkages, more specifically the vinyl-, allyl-, polyvinyl-, polyallyl-, vinyl-allyl-monomers, or other polymerizable unsaturated compounds providing the products therefrom are tri-dimensionally cross-linked within the particles to a condition of non-solubility, or providing at least one or more of the polymerization steps in the formation of the interpolymer particles hereof is a cross-linking polymerization step rendering the particles non-soluble. This non-solubility refers to organic solvents generally, as well as in the material to be thickened therewith, and as noted above and hereinafter these tri-dimensionally cross-linked vinylic fillers do not soften with temperature elevation. Such vinylic fillers may be chemically treated to introduce reactive or polar groups. The term therefore also includes, as a multi-polymerization product, the interpolymer type of vinylic filler and other vinylic fillers described in British Patent No. 799,043.

A vinylic filler particle is a colloidal sized particle, cross-linked to non-solubility and such a particle may be regarded as a single giant colloidal sized molecule. I have found that these giant colloidal sized rigid molecules have an affinity for fluid lubricants.

By the term "interpolymer" is meant the polymerization product produced when two or more monomers are polymerized sequentially or one or more monomers are polymerized in the presence of a polymer or when a condensation polymer is formed in presence of a polymer. When the components of an interpolymer are inseparable from one another because the component polymers are chemically bonded to one another then the newly created polymer is referred to as a "graft polymer." (See T. Alfrey, Jr., J. Bohrer and H. Mark's book entitled, "Copolymerization," published in 1952 by Interscience Publishers, Inc., New York, especially Chapter VIII.)

The vinylic fillers include those which may or may not comprise polar or reactive surface atoms and groups, for example, oxygen, nitrogen, sulfur or selenium, tellurium or the halogens especially in the form of amine, hydroxyl, mercaptan, acyl, carboxyl, thiocarboxyl, esterified carboxyl, esterfied thiocarboxyl, etherified hydroxyl or corresponding thioether, polysulfide, sulphone, sulphonic, nitro, nitrile, isonitrile, cyanate or isocyanate groups; and those which are, or are not surfaced with organic materials including amines, alcohols, phenols, acids, esters, ethers, acetals, nitro-compounds, nitriles, isonitriles, mercaptans, thiophenol, polysulfide, thioethers, sulphones, sulphonic acids or surfaced with inorganic materials including metal salts or metal complexes.

It was also found that vinylic fillers prepared utilizing polymeric emulsifying agents, were effective in the preparation of lubricant compositions. The polymeric emulsifiers used in preparation of vinylic fillers are of two classes: of natural origin and synthetic origin.

In connection with Example 13 of U.S. application S.N. 462,611, filed October 15, 1954, entitled, "Vinylic Filler Pigments" (now Patent No. 3,190,850, dated June 22, 1965), it was disclosed: "This example employed a vinylic filler graft formed from a hydrophilic polymer," viz styrene-maleic acid polymer (ratio 47/53 based on maleic anhydride).

In connection with Example 13A thereof, I disclosed: "This example is similar to Example 13 in that the same polymeric emulsifier is used to prepare the graft-formed vinylic filler, only in this case the principal monomer used in forming the vinylic filler is vinyl acetate which is a very useful monomer for this purpose both from the standpoint of availability and price."

Vinylic fillers of the graft vinylic type especially those graft-formed from hydrophilic polymers have, unexpectedly, unique physical properties. Thus, examples thereof from hydrophilic polymers hereinafter set forth, when used to thicken lubricant oils produce greases of high stability.

In preparing graft vinylic fillers from hydrophilic polymeric emulsifiers I prefer to employ 5 to 20% of such polymeric emulsifiers based on polymers used to form the graft vinylic fillers.

I have found that a variety of hydrophilic polymers can be employed for this purpose especially water-soluble or water dispersible polyelectrolytes. Hedrick and Mowry U.S. Patent No. 2,625,529, relating to "Methods of Conditioning Soils," list a number of the water-soluble polyelectrolytes and defines these materials as "synthetic water-soluble polyelectrolytes having a weight average molecular weight of at least 10,000 and having a structure derived by the polymerization of at least one monoolefinic compound through the aliphatic unsaturated group, and substantially free of cross-linking."

Using polyelectrolytes of the types listed by Hedrick and Mowry I have discovered that improved graft vinylic fillers can be formed by employing 0.001 to 50 percent preferably 0.02 to 20 percent based on the monomers used in the graft vinylic filler polymerization recipe. Thus, any water-soluble polyelectrolyte having a structure derived by the polymerization of at least one monoolefinic compound through the aliphatic unsaturated group may be used to form the cross-linked colloidal sized graft vinylic filler particles of this invention.

For brevity the water-soluble polyelectrolytes described in the aforesaid Hedrick and Mowry patent are included herein by reference. While Hedrick and Mowry for their purpose restricted their polyelectrolytes to those which are water-soluble I have discovered that I can use not only the water-soluble polyelectrolytes, but can also use the water-dispersible polyelectrolytes in forming graft vinylic fillers. By water dispersible I mean those polyelectrolytes which are not quite water-soluble but will form water dispersions usually exhibiting the Tyndall effect. Thus when polyelectrolytes for use in the present invention are prepared from hydrophilic and hydrophobic polymerizable monomers, the latter monomers may even exceed the former in quantity so long as the ratio is such as to result in a water-soluble or water-dispersible polyelectrolytes.

Water-soluble and water-dispersible polyelectrolytes wet and disperse poorly the monomers used in the polymerization recipe to form graft vinylic fillers. I have discovered that if a surface-active agent or a soap (in amounts of at least 0.01 to 0.5% based on monomers) is added together with the polyelectrolytes and the other components of the emulsion polymerization recipe used in preparing the graft vinylic filler latices, then the monomers emulsify more easily, the polymerization proceeds better, and above all prefloc is greatly reduced or eliminated. The amount of surface-active agent or soap may be below the amount necessary to form micelles, that is, the amount of surface-active agent or soap (if it is capable of forming micelles) may be below the critical concentration for micelle formation. Thus, the purpose of the surface-active agent or soap in combination with a polyelectrolyte is merely to reduce the surface tension of the graft vinylic filler polymerization recipe.

Any surface-active agent or soap can be used provided such material does not interfere with the polymerization recipe. Of the many surface-active agents which may be used for this purpose I refer to the list on pages 126 through 131, entitled, "Surface Active Agents," of Report No. 190, Second Series of the United States Tariff Commission entitled, "Synthetic Organic Chemicals"—United States Production and Sales, 1952, available 1953 from U.S. Government Printing Office, Washington, D.C. Also I. J. Novak in his U.S Patent No. 2,626,213 issued January 20, 1953, entitled, "Asbestos Dispersions and Methods of Forming Same," has listed a number of typical surface-active agents any of which I have found may be used herein for lowering the surface tension of polyelectrolyte emulsions in which the monomers are polymerized to produce the vinylic fillers.

By the term "vinylic pigment" or "vinylic filler pigment" is meant pigment material consisting essentially of vinylic fillers and/or graft vinylic fillers having on their particle surfaces at least one coloring component as hereafter defined; and said non-graft and graft-vinylic fillers consist of individual particles in the average size range of about 15 millimicrons to about 0.5 micron diameter, which individual particles are themselves non-soluble in organic solvents and have been prepared by cross-linking polymerization in aqueous dispersion of at least one monomer material selected from the class consisting of group (A) cross-linking monomers containing a plurality of polymerizable >C=C< groups and group (B) monomers containing a single polymerizable >C=C< group, said selected monomer material comprising at least one monomer selected from the group (A) and said particles being cross-linked thereby to the said non-soluble form; and said coloring component being selected from the class consisting of metals, metal compounds, inorganic and organic colors and color components, and combination of any thereof, and in this respect the term vinylic pigment is used in the same sense as in French Patent No. 1,135,872 and Canadian Patent No. 581,823.

Thus the term "vinylic filler material" includes vinylic fillers, graft vinylic fillers, and vinylic filler pigments, all of which comprise vinylic filler material, said vinylic filler material being made up essentially of polymer particles in the colloidal size range of about 5 millimicrons to about 0.5 micron average diameter; said particles being three-dimensionally cross-linked so that each particle is non-meltable and non-soluble in any solvent that does not break down its primary chain structure, i.e., that does not chemically decompose it; said particles having been prepared by cross-linking polymerization, in aqueous dispersion, of monomer material polymerizable therein and selected from the class consisting of the polymerizable monomers containing at least one carbon-to-carbon unsaturated group with the further limitation that the selection monomer material comprises cross-linking monomer material containing a plurality of such carbon-to-carbon unsaturated groups in at least a sufficient amount to effect, in said cross-linking polymerization, enough cross-linking within the particles to render them non-soluble as aforesaid.

The term "lubricants" as used herein includes the following types of fluid lubricants:

(1) Mineral lubricants derived from petroleum or coal tar, e.g., lubricating oils or lube oils (see The Condensed Chemical Dictionary, Reinhold Publishing Corporation, New York, 6th Edition, page 681).

(2) Synthetic lubricants including:

(a) Lubricating products produced by the polymerization of olefins such as ethylene, propylene, butylene, and isobutylene, and their mixtures in the presence of a condensation catalyst, e.g., a Friedel-Crafts catalyst under elevated temperatures and pressures. Examples of such polymers are the polyisobutylenes. Also included are the condensation products of these polymers with aromatic hydrocarbons such as xylol, benzol, and naphthalene, and the oxidation products of such polymers and of such condensation products.

(b) Lubricating products produced by the hydrogenation of coal, peat, asphalts, and petroleum residues.

(c) Lubricants produced by the voltol process, including voltolized fatty oils, and voltolized unsaturated hydrocarbons.

(3) Fatty oils of both animal and vegetable origin, such as castor oil, lard oil, neat's-foot oil, olive oil cocoanut oil, palm oil, soybean oil, cotton seed oil, tall oil, and esterified tall oil. Also included are completely or partially hydrogenated hydroxyated, epoxidized, and oxidized products of such fatty oils. These oils may include large proportions of fatty acids, or the mono- or di-glycerides of such oils.

(4) Ester lubricants including:

(a) Alkyl esters of organic acids including the alkyl lactates, oxalates, ricinoleates, and benzoates, e.g., ethyl ricinoleate. Dicarboxylic esters such as those prepared from alcohols having 4 to 12 carbon atoms and acids having 4 to 10 carbon atoms, such as phthalic, sebacic, succinic, glutaric, and adipic acids and their homologues. Specific examples of ester lubricants are di(2-ethylhexyl) sebacate, dibutyl sebacate, dioctyl sebacate, dimethyl phthalate, dibutyl phthalate and dioctyl phthalate.

(5) Alkyl, aryl, alkaryl and aralkyl esters of inorganic acids.

(a) Organic phosphorus esters, including phosphates, phosphites, phosphonates, phosphinates and the corresponding oxides. Typical are the alkyl phosphates such as trioctyl and tributyl phosphates and the alkaryl phosphates such as tricresyl phosphate.

(6) The polyoxyalkylene glycols made by polymerizing alkylene oxides and glycols at elevated temperatures using polymerization catalysts such as iodine, hydriodic acid, caustic potash, and $BF_3$-ether catalyst, and ether derivatives of such polyalkylene glycols, including:

(a) Polymeric water-soluble or water-insoluble or partially water-soluble fluids such as the polyglycols prepared from various alkylene oxides, e.g., ethylene oxide, propylene oxide- or the higher 1,2-epoxides, e.g., 1,2-propylene oxide; the monoalkyl ethers of polyalkylene oxides and glycols; condensation polymers of trimethylene glycol or ethylene glycol; and copolymers of ethylene oxide and 1,2-propylene oxide.

(b) The reaction products of monohydric alcohols and ethylene oxide and/or propylene oxide, the polymeric products thus formed being monoethers of polyoxyalkylene glycols with the monohydric alcohols. The "Ucon" (registered trademark) brand fluids and lubricants of Carbide and Carbon Chemical Div., Union Carbide and Carbon Corporation and the "Dowanol" brake fluids of the Dow Chemical Company, are of this type.

(7) Sulphur containing lubricants such as:

(a) Sulphur containing polymers obtained by treating unsaturated alcohols such as allyl alcohol, and unsaturated ethers such as divinyl ether, with hydrogen sulphide in the presence of a condensation catalyst such as toluene sulphonic acid, or a peroxide or in the presence of ultraviolet light.

(b) Sulphurized metal soaps of unsaturated fatty acids, especially the sulphurized soaps of metals of Groups I, II and III of Mendeleeff's periodic table derived from such unsaturated fatty acids as ricinoleic, undecylenic, oleic, elaidic, palmitolenic, and myristolenic acids, in which the amount of sulphur used should be about one atom or less per double bond present in the soap, temperatures of 180° C. to 210° C. for about one hour being required for the sulphur to sulphurize the unsaturated soap. Selenium and/or tellurium may be substituted in whole or in part for the sulphur in those lubricants; or rubber accelerators containing these elements may be used in place of these elemental materials to vulcanize the unsaturated soaps for the preparation of high pressure lubricants.

(8) Halogenated organic compounds including:

(a) The fluorocarbons prepared by the fluorination of hydrocarbon oils such as the paraffinic base oils, the naphthenic base or highly aromatic petroleum oils, or synthetic hydrocarbon oils such as the Fischer-Tropsch oils. Fluorination in such cases is accomplished by any of the methods well known to those skilled in the art such as passing the hydrocarbon vapours diluted with an inert gas over a fluorinating agent such as cobalt trifluoride.

(b) Polymers of chlorotrifluoroethylene give satisfactory products for this purpose (e.g., the Fluorolube products of Hooker Electrochemical Co.).

(c) Fluorinated monocarboxylic acids such as butyric, valeric, caproic, caprylic, capric, lauric, myristic, palmitic and stearic acids. Likewise perfluorinated derivatives e.g. esters of aliphatic, alicyclic and aromatic dicarboxylic acids. Further perfluorinated alcohols such as perfluorinated octyl, decyl, or dodecyl alcohol per se, or esterified with acids including phosphoric, phosphorous, phosphonic, phosphinic and the perfluorinated acids derived from such phosphorus acids.

(d) Fluorinated oir chlorinated paraffins may be used, especially in admixture with more fluid lubricants.

(e) Telomerization reaction products of perfluoroolefins with perfluoroalkyl iodides are coupled to produce a highly fluorinated oil useful as high temperature lubricants. Thus for example perfluoropropene is thermally telomerized with perfluoro-2-iodopropane to produce $C_3F_7[CF_2—CF(CF_3)]_nI$ which with mercury under ultraviolet light or with mercury oxide at 200° C. and higher, is coupled with itself to form $$C_3F_7[CF_2—CF(CF_3)]_n[(CF_3)CF—CF_2]_nC_3F_7$$

where $n$ is 1 to 10, preferably 4 to 6.

(9) Silicone and meta silicate polymers such as polysiloxane base oils, characterized by the repetitive units:

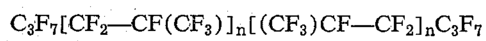

$$—Si(R)(R^1)O—,\ —Si(R)(XR^1)O—\ \text{or}\ —Si(XR)(XR^1)O—$$

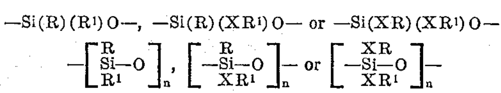

$$—\left[\begin{matrix}R\\ Si—O\\ R^1\end{matrix}\right]_n,\ \left[\begin{matrix}R\\ —Si—O\\ XR^1\end{matrix}\right]_n—\ \text{or}\ \left[\begin{matrix}XR\\ —Si—O\\ XR^1\end{matrix}\right]_n—$$

wherein R and $R^1$ are radicals selected from the group comprising alkyl or cycloalkyl radicals containing less than 20 carbon atoms, aromatic radicals, alkaryl radicals, aralkyl and terpenic radicals and X is an atom selected from the group consisting of oxygen, sulphur, selenium and tellurium. Suitable radicals R, $R^1$ are methyl, ethyl, n-propyl, isopropyl, the various butyl, amyl, hexyl, heptyl, octyl, nonyl, decyl and higher alkyl radicals as well as cyclic groups such as phenyl, benzyl, tolyl, naphthyl, cyclopentyl, cyclohexyl and their homologs. These radicals may also contain substituent groups or atoms such as sulphonic acid, alkoxy, nitro, halogen, including chlorine and fluorine. Examples of such oils are Dow Corning Fluids (Nos. 200, 330, 510, 550 and 710).

(10) Polyphenoxy ethers represented by the formula $C_6H_5(—O—C_6H_4)_n—OC_6H_5$ wherein $n=1$ to 5. All of such compounds (i.e., o-, m-, p-derivatives) have good thermal stability (decomposition temperatures in the range of 800 to 1100° F.) and form good high temperature vinylic filler greases. However, the compounds having meta-phenoxy linkages are preferred for my vinyl filler greases in view of their liquid state at near normal temperature. Thus bis(m-phenoxyphenyl)ether is fluid above 5° F., m-bis(m-phenoxy-phenoxy)benzene is fluid above 40° F., bis[m-(m-phenoxyphenoxy)-phenyl]ether is fluid above 57° F., and m-bis[m-(m-phenoxyphenoxy-phenoxy)-phenoxy]benzene is fluid above 70° F. Mixtures of these are likewise useful as lubricants compositions when thickened with the vinylic fillers to form greases of the present invention, such mixtures having lower freezing points than any of the individual components.

The "lubricants," which as just noted include (1) mineral lubricants, (2) synthetic hydrocarbon lubricants, (3) fatty oils, (4) ester lubricants, (5) alcohol esters of inorganic acids, (6) polyoxyalkylene glycol lubricants, (7) sulphur containing lubricants, (8) halogenated organic compounds (9) silicones and meta silicates and (10) polyphenoxy ethers according to this invention are admixed with vinylic fillers to form, with or without other additives, the new lubricating and grease compositions of this invention. The viscosity of the lubricants, and the type and quantity of the vinylic filler, together determine the viscosity of the new lubricant compositions, and even relatively light oils can be converted into stiff greases by incorporating vinylic fillers therein.

The lubricating compositions of this invention comprising a lubricant and vinylic filler as herein defined can also be compounded with ingredients often used in the manufacture of lubricating fluids and greases, the most important among these being the gelling agents, especially the soaps of fatty acids and/or their glycerides.

The usual saponifiable materials used to form such gelling agents have from 8 to 32 carbon atoms and may be naphthenic acids, rosin acids, abietic acids, petroleum sulphonic acids or saturated, unsaturated or polar-substituted fatty acids. Such saturated fatty acids are, for example, capric, lauric, myristic, palmitic and stearic, and the unsaturated fatty acids are, for example, arachidic, behenic, oleic, linoleic, linolenic, cotton seed fatty acids, palm oil fatty acids, soya bean fatty acids, castor oil fatty acids, tallow fatty acids and tall oil fatty acids. The unsaturated fatty acids may be partially or completely hydrogenated and/or hydroxylated and/or epoxidized or otherwise oxidized. Other fatty acids may include acids produced by oxidation of petroleum oils, petroleum waxes and naturally occurring waxes such as montan wax.

The soaps of the hydroxy fatty acids especially preferred for grease-compounding such as the soaps of the hydroxy or dihydroxy stearic acids are especially useful with the vinylic fillers.

The soaps may be of any of the known types, such as those made from the oxides or hydroxides of one or several metals from Groups I, II, III, IV and VIII of Mendeleeff's periodic table. A water-soluble soap such as the sodium, potassium or ammonium soap is usually first prepared and the insoluble metal soap of the organic acid is then precipitated by adding a water-soluble salt of the precipitating metal. Sodium, potassium, lithium, calcium, magnesium, barium, strontium, cadmium, zinc, aluminum, lead, cobalt and tin soaps are effectively used with vinylic fillers and lubricants to form the lubricating and grease compositions of this invention. Examples of preferred soaps for use either alone or in admixture are: sodium stearate, sodium hydroxystearate, sodium oleate, potassium, stearate, potassium rosinate, potassium oleate, lithium stearate, lithium hydroxystearate, lithium rincinoleate, calcium stearate, calcium hydroxystearate, barium stearate, barium hydroxystearate, strontium stearate, cadmium oleate, cadmium stearate, cadmium rosinate, zinc stearate, aluminium naphthenates, aluminium stearate, aluminum hydroxystearate, lead naphthenates, lead stearate, lead hydroxystearate, magnesium stearate, magnesium oleate, magnesium rosinate, magnesium naphthenate, magnesium hydroxystearate, tin stearates and tin naphthenates. Soaps of amines such as stearyl amine or triethanolamine may also be used either alone or in conjuction with the metal soaps.

Vinylic fillers, when used in lubricants, are preferably prepared with an emulsifier, the acid component of which is chosen from the class of acids used in the preparation of gelling agents for lubricant and grease manufacture as heretofore described, such as the fatty acids, rosin acids, naphthenic acids, and hydroxylated and epoxidized fatty acids and vinylic fillers prepared with such emulsifiers can likewise be precipitated with compounds of the metals of groups I, II, III, IV and VIII of Mendeleeff's periodic table either in the absence or presence of the lubricating fluid. For example, a vinylic filler prepared with the ammonium, sodium, or potassium soap of ricinoleic acid or hydroxy stearic acid as emulsifier can be precipitated from its latex as the calcium salt by adding a water solution of calcium chloride to such latex and the precipitated vinylic filler is then filtered, preferably water-washed and dried. Even though vinylic fillers themselves do not soften, such soap coated vinylic fillers can be dispersed in the selected lubricant by elevating the temperature of such lubricant to the softening temperature of the metal soap on the surface of the vinylic filler. In most cases 150° C.–200° C. is sufficient as most metallic soaps soften at these temperatures. If one is using a vinylic filler prepared with a stearate soap and precipitated with a heavy metal salt then the soap softening temperatures are exemplified approximately by the following: magnesium stearate 140°–150° C.; calcium stearate 145°–180° C.; zinc stearate 112°–130° C.; aluminum stearate 165°–170° C.; lead stearate 100°–120° C.; silver stearate 205° C.; barium stearate 160° C.

Manufacturing methods of incorporating metallic soaps into lubricants to form bodied lubricants and greases are well known in the art, and I have found that vinylic fillers having metallic soaps on their surfaces can be incorporated into such lubricants by the same methods and equipment.

C. J. Boner in his treatise entitled, "Manufacture and Application of Lubricating Greases," published in 1954 by Reinhold Publishing Corp., New York, N.Y., gives especially in Chapters 8 to 13, a detailed discussion of the soaps of aluminium, barium, calcium, lithium, sodium, lead and strontium as components of lubricating greases, and such information together with other literature on lubricants, may be followed in preparing lubricants and greases for blending with vinylic fillers in accordance with this invention; and in addition all or part of the gelling agents ordinarily prescribed may be eliminated when the vinylic fillers are employed.

To vinylic filler latices can be added a water-soluble soap of a fatty acid such as potassium hydroxystearate together with sufficient water to keep the system fluid and then a metal salt such as calcium chloride dissolved in water can be added. The vinylic filler and the calcium hydroxystearate coprecipitate and the resulting precipitates are easily filtered, washed, and dried. The resulting products can be incorporated into lubricants by the usual techniques of heating and working employed by the grease-making industry.

Electron micrographs demonstrate the effect of vinylic filler in lubricants according to the invention and for example show the influence the vinylic fillers have on the physical structure, combination of vinylic fillers, lubricant and a metallic soap tending to make structure more uniform. Thus, the compounding of a vinylic filler in a grease yields a product which has less tendency to change with variations of temperature and degree of physical working.

Vinylic fillers can be used in accordance with the invention in conjunction with other thickening agents such as the Bentones (registered trademark), magnesia, colloidal silica, alumina and other metal oxides or hydroxides or sulphides. Metal mono- or polysulfides, selenides, or tellurides e.g. molybdenum polysulfide may be precipitated on the surface of vinylic filler when such vinylics are either in aqueous or solvent dispersion or when the vinylic fillers are in dry powder form.

Vinylic fillers can be incorporated into organic fluids suitable as lubricating fluids by any convenient method.

A direct method of incorporating these lubricants is to mix them with vinylic filler aqueous latex and if the lubricant is water-soluble, it will mix with the vinylic filler latex and the water may then be removed by any suitably procedure, for example, by heating above 100° C. If the lubricant is not water-soluble, the mixture may be effected by heating while agitating, a high speed blender or grinding or milling being useful for this purpose. I have discovered that if the agitation is sufficient the lubricant will displace the water from the surface of the vinylic filler particles. When preparing the vinylic filler with an emulsifier one can employ a type of emulsifier which is soluble in the organic lubricating fluid, or convert the emulsifier to a soluble type before incorporating the lubricant into the vinylic filler latex.

Instead of employing the mechanical method for direct replacement of water in a vinylic filler latex by the organic lubricant, a mutual solvent method may be employed. For example, the vinylic filler latex may be treated with a solvent in which both water and the organic lubricant chosen are miscible. For example, if the lubricant is a polyoxyalkylene glycol or polyester synthetic lubricant one can employ a mutual solvent such as acetone and in such cases the water is displaced with acetone preferably after the vinylic filler has been agglomerated with an alkaline earth metal compound. Into the vinylic filler filter cake wet with acetone is incorporated the lubricant, and the water and the mutual solvent, in this case, acetone is removed by evaporation or boiling off.

If a suitable mutual solvent is not available for the direct replacement of water by the lubricant then two solvents may be used together or in sequence, as for example, acetone and toluene.

Vinylic filler particles having carboxylic groups on their surfaces can be dispersed in lubricant as follows: first by incorporating an amine, which is soluble therein, in the lubricant, then mixing into the lubricant, containing the amine, dried vinylic filler and raising the temperature of the mixture until the vinylic filler disperses, that is, to about 150° C. A similar technique can be employed with vinylic filler particles having other reactive groups on their surfaces such as aldehyde or acyl groups, which can react with amines.

In formulating lubricants, basic hydrophilic cationic surface-active agents may be used with vinylic fillers (with or without inorganic thickening agents being present) and such surface-active agents include higher aliphatic amines, quaternary ammonium compounds, polyamines, cyclic (nuclear or extranuclear) amines, and substitution derivatives thereof containing chlorine atoms, hydroxy, etherified hydroxyl, esterified carboxyl, mercaptan or nitro groups.

The higher aliphatic amines useful in compounding vinylic fillers into greases are those having preferably 10 or more carbon atoms such as dodecyl amines, heptadecyl amines, lauryl amines, stearyl amines and other primary, secondary and tertiary aliphatic amines.

Quaternary ammonium compounds which may be employed with such vinylic fillers are dimethyl hydroxyethyl dodecyl ammonium hydroxide, dimethyl benzyl octadecyl ammonium chloride, and dimethyl benzyl lauryl ammonium chloride.

Polyamines which may be employed are the ammonolysis products of chlorinated paraffin wax, the interaction products of acrolein and ammonia, the adducts of hydrogen sulphide and diallylamine, the polyethylene polyamines and polyamines containing nitrile groups. In addition, basic fatty acid amides of these aminonitriles may be used as well as the amides of polyamines such as oleic acid amide of tetraethylene pentamine.

Reactive vinylic fillers having carboxyl, or acyl groups can be combined with alkaline amine condensation products of a diamine or polyamine, including polyamine-nitriles, with dibasic acids, e.g. phthalic, malonic, succinic, glutaric, adipic, or the basic amine condensation products of the mono-alkyl or mono-alkenyl esters of such dibasic acids; an example of this latter type of condensation product is the ethylenediamine salt or acid amide of the mono-dodecyl ester of succinic acid.

If vinylic fillers having basic groups, such as amino groups, on their surfaces are employed then an acid can be incorporated together with such filler in the lubricant and with the aid of heat and agitation the dry basic vinylic filler is dispersed in the lubricant.

Vinylic fillers as represented by the examples from tables XVI, XVII and XVIII of my British Patent No. 799,043 have, on their colloidal particle surface, active carboxyl groups available for chemical reaction.

The carboxylic acid group of the vinylic filler may be esterified with an alcohol, a polyalcohol, glycol, polyglycol, hydroxy amine, hydroxy ester, hydroxy nitro compound and other hydroxy-group-containing compounds. Fatty acids of all types, including the unsaturated fatty acids can be reduced to alcohols, e.g., the alcohols consisting principally of lauryl alcohol from cocoanut oil fatty acid, and stearyl alcohol from stearic acid. Numerous other alcohols are useful herein including the phenyl substituted monohydric and polyhydric alcohols, and I prefer to use those having a boiling point above that of water to permit rapid removal of water and thus expedite formation of the ester, e.g., n-butanol, diacetone alcohol, diisobutyl carbinol, 2-ethylbutanol, 2-ethylhexanol, heptanol-3, n-hexanol, phenyl methyl carbinol, tetradecanol, heptadecanol, tetrahydrofuran-2-methanol, trimethylcyclohexanol, trimethylnonyl alcohol, or undecanol.

Polyhydroxyl compounds can be used to form esters with the carboxylic vinyl fillers of this invention, such as the glycols, glycerine and the sugars e.g. pentaerythritol.

The carboxylic acid groups of the vinylic filler may be esterified with glycol-ethers, e.g., ethylene glycol monomethyl ether, ethylene glycol monoethyl ether, ethylene glycol monobutyl ether, ethylene glycol monophenyl ether, diethylene glycol monoethyl ether, diethylene glycol monobutyl ether, or diethylene glycol monophenyl ether.

The reaction products of the following amino-alcohols, namely, diethyl ethanolamine, dimethyl ethanolamine, N-hydroxyethyl morpholine, N-methyl diethanolamine, triethanolamine, and triisopropanolamine, with carboxylic vinylic fillers may also be used in the preparation of lubricating compositions according to the invention.

The carboxylic acid groups of the vinylic filler may be esterified with polyalkylene glycols, e.g., polyethylene glycols with average molecular weights of approximately 200, 300, 400, 600, 1000, 1500, 1540, 4000 and 6000; the polypropylene glycols with average molecular weights of approximately 150, 425, 1025, 2025; and the methoxy propylene glycols with molecular weights of approximately 350, 550 and 750.

The carboxylic acid groups of the vinylic filler can form phenolic esters, e.g., with phenol, cresol, hexyl phenol, octyl phenol, nonyl phenol, dinonyl phenol, dodecyl phenol, resorcinol, o-dimethyl amino-methyl-p-butyl phenol, o-dimethylaminomethyl-p-octylphenol, or 2,4,6-tri(dimethylaminomethyl)phenol or the hydroxyphenoxy ethers represented by the formulae:

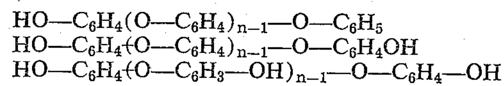

$$HO{-}C_6H_4(O{-}C_6H_4)_{n-1}{-}O{-}C_6H_5$$
$$HO{-}C_6H_4(O{-}C_6H_4)_{n-1}{-}O{-}C_6H_4OH$$
$$HO{-}C_6H_4(O{-}C_6H_3{-}OH)_{n-1}{-}O{-}C_6H_4{-}OH$$

in which $n=1$ to 5 and including the o-, p-, and m-derivatives.

The esters of the carboxylic vinylic fillers can be prepared by various procedures. For example, if the alcohol, polyalcohol, glycol-ether, aminoalcohol, or polyalkylene glycol, is soluble in water and has a boiling point above water, then such is incorporated in the carboxylic vinylic filler latex before all the water has been removed from such latex or latex coagulum. This permits thorough blending of the vinylic filler particles and the hydroxyl compound so that when the remaining water is removed the temperature can be raised to form the ester by water removal.

If the hydroxy compound is soluble in aromatics then an aromatic hydrocarbon solvent such as toluene is added to the dried or partially dried latex and heat applied to distill out the water with the hydrocarbon distillate using a trap in the distillate system to permit removal of the water resulting from formation of the ester.

If the hydroxy compound is soluble in lubricants, e.g., mineral oil, then the carboxylic vinylic filler and the hydroxy compound is added to the lubricant and the temperature is raised above the boiling point of water and, preferably while agitating, the water is removed until the ester formation is complete.

A further useful reaction of the carboxylic vinylic fillers is the formation of acid amides by heating the vinylic filler having carboxylic groups on its colloidal particle surfaces with an amine, hydroxy amine, or polyethoxy amine, e.g., aminoethyl ethanolamine, N-aminopropyl morpholine, di-n-butyl amine, diethylene triamine, di(2-ethylhexyl)amine, diisopropanolamine, dimethyl isopropanolamine, 2-ethylhexylamine, tetraethylene pentamine, triethylamine, tertiary butylamine, tertiary octylamine, mixed tertiary amines known as Primene 81–T, Primene JM–T, and the mixed polyethoxyamines known as Priminox 10, Priminox 21, and Priminox 32 (both the Primenes and Priminoxes are sold by Rohm & Haas Company, Philadelphia, Pa.); a further series of water-insoluble amines useful in preparing the acid amides of vinylic fillers are the primary and secondary amines derived from soap makers fatty acids, such as the Armeens (Registered trademark) 120, 16D, 18C, CD, S, SD, T, TD, HT, HTD, 2C, 2HT produced by Armour & Company, Chicago, Illinois.

Acid amides can be prepared from carboxylic vinylic fillers and aromatic amines, such as aniline, monomethylaniline, diphenylamine, the tolylene diamines, naphthylamines, sulphonic acids of aromatic amines, e.g., sulphanilic acid, the sulphonic acids of naphthylamines, e.g., F-acid, Cleve's acids, amino-G-acids, H-acid and substitution derivatives of these.

These acid amides are formed like the esters by adding the water-soluble amines to the carboxylic vinylic filler latex shortly before all the moisture has been removed therefrom and then removing the moisture with or without an azeotropic solvent to aid in water removal to form the acid amide.

The oil-soluble amines can be added directly to the lubricant oil base with the vinylic filler latex or wet coagulum therefrom and the water removed by heating and agitation with or without vacuum.

For special purposes the vinylic filler may be surfaced with aminoplasts or phenoplasts. Thus in the presence of vinylic filler material, urea, melamine, thiourea, guanidine or the like is condensed with an aldehyde such as formaldehyde, glyoxal, furfural, acrolein, methacrolein, benzaldehyde, aldol and the like with or without mono- or polyhydric alcohols and with or without the aid of a basic or acidic catalyst to form the aminoplast treated vinylic filler.

In the presence of vinylic filler material phenol or a substituted phenol such as formaldehyde, glyoxal, furfural and like aldehydes (including those set forth above under aminoplast), and with or without the aid of a basic or acidic catalyst, form the phenoplast treated vinylic filler. The surface treatment of vinylic fillers with aminoplasts and phenoplasts changes their surface character and thus makes them useful with certain polar lubricants. Likewise, the provision of vinylic fillers with residual unsaturation or which may have been chemically treated to provide them with reactive or polar groups can change the surface characteristics and coaction of the vinylic fillers with the lubricants.

The thermal stability of the grease or lubricant composition will determine the maximum temperature at which the lubricant will function efficiently in modern military and industrial usages. The thermal stability of the greases in turn is dependent on the thermal stability of (1) the vinylic filler, (2) the lubricant, and, if the emulsifier used in preparing the vinylic filler latex is not removed by washing during the manufacturing process, (3) the emulsifier. Thus for high temperature usage the practice of the present invention provides for removal of emulsifier and the use of thermally stable vinylic fillers and lubricants. The removal of Duponol ME and Ultrawet K, for example, from the vinylic filler increased the decomposition temperature for a styrene/divinylbenzene (80/20) vinylic filler from about 500° F. to about 700° F.; a lubricant oil vinylic filler composition showed corresponding increase in thermal stability within the limits of decomposition temperatures of the lubricant oil.

Examples of vinylic fillers for lubricants and compositions according to the invention containing vinylic fillers are given in Tables I, II and III. In these tables and in Example III—10 parts and percentages are by weight. Table I tabulates typical preparations of vinylic fillers useful in preparing typical vinylic filler lubricants of the present invention. Examples C and D therein show the preparation of the polymeric emulsifier in Step I and utilized in Step II preparation of the vinylic filler.

Vinylic fillers having carboxylic and/or sulfonic acid groups on their surfaces can be reacted with a metallic oxide or hydroxide from the metals of group I of the periodic table, e.g., lithium, sodium, or potassium, to form alkali metal salts of the said acidic groups, and these alkali metal salts of acidic vinylic fillers can be further reacted with water soluble metal salts of selected metal of groups II through VIII of the periodic table, especially the salts of metals of groups IIA, IIIA, and IVA for partial or complete substitution of the alkali metal by the selected metal, e.g., magnesium, calcium, barium, aluminum, tin and/or lead. Especially the vinylic fillers having both alkali metal salt groups and other metal salt groups are useful in the preparing of lubricating compositions, as these vinylic fillers with mixed metal salt groups on their surfaces a part of which are alkali metal salt groups, have the advantage of imparting a degree of moisture retentivity to the filler which is advantageous in certain grease formulations. These provisions are attainable by substituting latex type H (Table I) for the latices used in Examples L–B–9 through –12 of Table II, and further in the so modified examples reduction of the amount of coagulant salt employed allows some alkali metal salt groups to be retained by the filler, or omission of the coagulant enables one to obtain vinylic fillers comprising acidic groups in alkali metal salt form, of which those having lithium groups are particularly useful in grease formulations.

TABLE I.—VINYLIC FILLERS FOR LUBRICANT AND GREASE EXAMPLES

| Example No. I– | A | B | C | D | E |
|---|---|---|---|---|---|
| Composition | | | | | |
| Polymerization Step I: | | | | | |
| Styrene | 70 | 70 | 47 | 47 | 90 |
| Divinylbenzene | 20 | 20 | ------ | ------ | 10 |
| Acrolein | 10 | ------ | ------ | ------ | ------ |
| Methacrolein | ------ | 10 | ------ | ------ | ------ |
| Maleic anhydride | ------ | ------ | 53 | 53 | ------ |
| Methacrylic acid | ------ | ------ | ------ | ------ | ------ |
| Benzene | ------ | ------ | 800 | 800 | ------ |
| Benzoyl peroxide | ------ | ------ | 1.75 | 1.75 | ------ |
| Dodecyl mercaptan | ------ | ------ | 1.0 | 1.0 | ------ |
| Reaction Conditions | | | | | |
| Polymerization Recipe | [1] A | [1] A | ------ | ------ | [1] A |
| Polymerization temperature, ° C | 70 | 70 | 80 | 80 | 60 |
| Polymerization time, hrs | 15 | 15 | 12 | 12 | 12 |
| Conversion (total solids), percent | 26.0 | 26.2 | (2) | (2) | 25.6 |
| Polymerization Step II: | | | | | |
| Water | ------ | ------ | 680 | 600 | 50 |
| Polymer (Step I), dry basis | ------ | ------ | 10 | 10 | 100 |
| Duponol ME | ------ | ------ | 0.3 | 0.3 | ------ |
| Ammonium persulphate | ------ | ------ | 1.0 | 1.0 | ------ |
| Styrene | ------ | ------ | 90 | ------ | 10 |
| Divinylbenzene (50%) charged 100% basis | ------ | ------ | 10 | 10 | ------ |
| Methyl methacrylate | ------ | ------ | ------ | ------ | ------ |
| Vinyl toluene [3] | ------ | ------ | ------ | 90 | ------ |
| Sodium sulphite | ------ | ------ | 0.5, | 0.5 | ------ |
| Aqueous Ammonia, 28% | ------ | ------ | 7.3 | 7.2 | ------ |
| Tetraethylene pentamine | ------ | ------ | ------ | ------ | 0.5 |
| Cumene hydroperoxide | ------ | ------ | ------ | ------ | 0.5 |
| Reaction Conditions: | | | | | |
| Polymerization temperature, ° C | ------ | ------ | 60 | 60 | 60 |
| Polymerization time, hours | ------ | ------ | 8 | 8 | 5 |
| Conversion (total solids), percent | ------ | ------ | 13.7 | 14.5 | 23.4 |

TABLE I.—Continued

| Example No. I– | F | G | H | I |
|---|---|---|---|---|
| Composition | | | | |
| Polymerization Step I: | | | | |
| Styrene | 90 | 90 | 80 | 80 |
| Divinylbenzene | 10 | 10 | 10 | 10 |
| Acrolein | ------ | ------ | ------ | ------ |
| Methacrolein | ------ | ------ | ------ | ------ |
| Maleic anhydride | ------ | ------ | ------ | ------ |
| Methacrylic acid | ------ | ------ | 10 | 10 |
| Benzene | ------ | ------ | ------ | ------ |
| Benzoyl peroxide | ------ | ------ | ------ | ------ |
| Dodecyl mercaptan | ------ | ------ | ------ | ------ |
| Reaction Conditions | | | | |
| Polymerization Recipe | [1] A | [1] A | [1] A | [1] A |
| Polymerization temperature, °C | 60 | 60 | 60 | 60 |
| Polymerization time, hours | 12 | 12 | 12 | 12 |
| Conversion (total solids), percent | 25.6 | 25.6 | 26.8 | 27.0 |
| Polymerization Step II: | | | | |
| Water | 50 | ------ | ------ | ------ |
| Polymer (Step I), dry basis | 100 | ------ | ------ | ------ |
| Duponol ME | ------ | ------ | ------ | ------ |
| Ammonium persulphate | ------ | ------ | ------ | ------ |
| Styrene | ------ | ------ | ------ | ------ |
| Divinylbenzene (50%) charged 100% basis | ------ | ------ | ------ | ------ |
| Methyl methacrylate | 10 | ------ | ------ | ------ |
| Vinyl toluene [3] | ------ | ------ | ------ | ------ |
| Sodium sulphite | ------ | ------ | ------ | ------ |
| Aqueous Ammonia, 28% | ------ | ------ | ------ | ------ |
| Tetraethylene pentamine | 0.5 | ------ | ------ | ------ |
| Cumene hydroperoxide | 0.5 | ------ | ------ | ------ |
| Reaction Conditions: | | | | |
| Polymerization temperature, ° C | 60 | ------ | ------ | ------ |
| Polymerization time, hours | 5 | ------ | ------ | ------ |
| Conversion (total solids), percent | 24.9 | ------ | ------ | ------ |

| Code No | G-56 | G-57 | G-41B | G-45 |
|---|---|---|---|---|
| Example No. I– | J | K | L | M |
| Composition | | | | |
| Polymerization (Step I): | | | | |
| Acrylonitrile | ------ | 2 | ------ | 30 |
| Styrene | ------ | 88 | 90 | 60 |
| Vinyltoluene | 90 | ------ | ------ | ------ |
| Divinylbenzene [4] | 10 | 10 | 10 | 10 |
| Water | 325 | 350 | 325 | 800 |
| Hydroxystearic Acid | 10 | 10 | 10 | 10 |
| Ammonia (28%) | 5.6 | 5.6 | 6.7 | 15.7 |
| Diisopropylbenzene hydroperoxide | 1.25 | 1.25 | 1.25 | 1.25 |
| Tetraethylenepentamine | 0.3 | 0.325 | 0.325 | 0.65 |
| Polymerization Temperature, ° C | 55–75 | 55–75 | 65–75 | 55–75 |
| Polymerization, Time, Hours | 4 | 6 | 6 | 7 |
| Conversion, percent | 96 | 99 | 97 | 87 |
| Total Solids, percent | 22.8 | 23.5 | 24.5 | 10.3 |

| Code No | 8-013 | G-51 | G-53 | G-95C |
|---|---|---|---|---|
| Example No. I– | N | O | P | Q |
| Composition | | | | |
| Polymerization (Step I): | | | | |
| Acrylonitrile | ------ | 30 | ------ | ------ |
| Styrene | ------ | 60 | 90 | ------ |
| Vinyltoluene | 90 | ------ | 90 | ------ |
| Dichlorodifluoroethylene | ------ | ------ | ------ | 80 |
| Divinylbenzene [4] | 10 | 10 | 10 | 20 |
| Potassium persulfate | ------ | ------ | ------ | 1.5 |
| Sodium bisulfite | ------ | ------ | ------ | 0.5 |
| Water | 220 | 700 | 700 | 400 |
| Hydroxystearic Acid | ------ | 10 | 5 | ------ |
| Ammonia (28%) | ------ | 15.7 | 5.6 | ------ |
| Diisopropylbenzene hydroperoxide | 1.25 | 1.25 | 1.25 | ------ |
| Tetraethylene pentamine | ------ | 0.65 | 0.3 | ------ |
| Ultrawet K (at 85% conc.) | 10 | ------ | ------ | ------ |
| Ferrous sulfate heptahydrate | 0.19 | ------ | ------ | ------ |
| Potassium pyrophosphate | 0.21 | ------ | ------ | ------ |
| Ammonium perfiurocaprylate | ------ | ------ | ------ | 10 |
| Polymerization temperature, ° C | 60–90 | 55–75 | 60–80 | 60 |
| Polymerization, time, hours | 6 | 6 | 5.5 | 16 |
| Conversion, percent | 100 | 88 | 90 | 49 |
| Total Solids, percent | 33.6 | 11.8 | 21.8 | [5] 39 |

| Code No | G-95D | IX-365D | G-79E |
|---|---|---|---|
| Example No. I– | R | S | T |
| Composition Polymerization (Step I): | | | |
| Dichlorodifluoroethylene | 80 | 80 | 24 |
| Perfluorobutylacrylate | ------ | ------ | 56 |
| Divinylbenzene [4] | 20 | ------ | 20 |
| Tetrachlorodivinyl benzene | ------ | 20 | ------ |
| Potassium persulfate | 1.5 | 0.4 | 1.2 |
| Sodium bisulfate | 0.5 | 0.2 | 0.6 |
| Water | 400 | 300 | 600 |
| Ultrawet K (at 85% conc.) | ------ | 10 | ------ |
| Duponol ME | ------ | ------ | 20 |
| Ammonium perfluorocaprylate | 20 | ------ | ------ |
| Polymerization temp., ° C | 60 | 90 | 60 |
| Polymerization time, hours | 16 | 18 | 16 |
| Conversion, percent | 30 | 24 | 88 |
| Total solids, percent | [5] 18 | [5] 50 | 14.8 |

| Code No. G– | 84-B | 111-D | 114-B | 117 | 75-D | 93-C |
|---|---|---|---|---|---|---|
| Example No. I– | U | V | W | X | Y | Z |
| Composition Polymerization: | | | | | | |
| Vinylidene-chloride | 40 | ------ | ------ | ------ | ------ | ------ |
| Difluoro-dichloro-ethylene | 40 | 80 | ------ | ------ | 40 | ------ |
| Vinyltriethoxysilane | ------ | ------ | 67 | 80 | 40 | ------ |
| 2,3-dichlorohexa-fluorobutene-2 | ------ | ------ | ------ | ------ | ------ | 40 |
| Styrene | ------ | ------ | 16 | ------ | ------ | 40 |
| Divinylbenzene (53%) | 20 | 20 | 17 | 20 | 20 | 20 |
| Water | 400 | 400 | 500 | 600 | 300 | 400 |
| Duponol ME | 15 | ------ | 16 | 20 | 10 | 10 |
| Ammonium per-fluorocaprylate | ------ | 20 | ------ | ------ | ------ | ------ |
| t-Butylperbenzoate | ------ | ------ | ------ | 0.4 | ------ | ------ |
| $K_2S_2O_8$ | 1.0 | 1.5 | 0.7 | ------ | 0.4 | 1.5 |
| $NaHSO_3$ | 0.2 | 0.5 | 0.35 | 0.8 | 0.2 | 0.5 |
| $AgNO_3$ | 0.09 | ------ | ------ | ------ | ------ | ------ |
| $FeSO_4 \cdot 7H_2O$ | ------ | ------ | ------ | 0.8 | ------ | ------ |
| Polymerization, Temp., ° C | 70 | 60 | 60 | 40 | 60 | 60 |
| Polymerization, Time, Hrs | 40 | 16 | 64 | 40 | 16 | 40 |
| Conversion, percent | 54 | 24 | 44 | 48.5 | 60 | 42 |
| Total Solids, percent | 12.2 | 6.2 | 7.2 | 16.2 | 10 | [6] 27.6 |

| | | | K-IV | | | | G-II |
|---|---|---|---|---|---|---|---|
| Code No., G– | 100 | 102 | 293 | 276 | 291 | 279 | 67 |
| Example No. I– | AA | AB | AC | AD | AE | AF | AG |
| Composition Polymerization: | | | | | | | |
| Vinylidenechloride | ------ | 44.4 | ------ | ------ | ------ | ------ | ------ |
| Difluoro-dichloro-ethylene | ------ | 22.2 | ------ | 80 | ------ | ------ | ------ |
| Vinyltriethoxy-silane | ------ | ------ | ------ | ------ | ------ | 80 | ------ |
| Styrene | ------ | ------ | 60 | ------ | 80 | ------ | 40 |
| Diallylbenzene-phosphonate | 80 | 22.2 | ------ | ------ | ------ | ------ | ------ |
| Divinylbenzene (53%) | 20 | 11.2 | 40 | 20 | 20 | 20 | 60 |
| Water | 800 | 440 | 400 | 400 | 600 | 600 | 600 |
| Mersolate | ------ | ------ | 10 | ------ | ------ | ------ | ------ |
| Diisopropyl-benzene-hydro-peroxide | ------ | ------ | 1.3 | ------ | ------ | ------ | ------ |
| Ultrawet K | ------ | ------ | ------ | ------ | 10 | ------ | 12 |
| Duponol ME | 10 | 8.4 | ------ | ------ | ------ | 10 | ------ |
| Ammonium per-fluorocaprylate | ------ | 2.8 | ------ | 15 | ------ | ------ | ------ |
| t-Butylperben-zoate | ------ | ------ | ------ | ------ | ------ | 1.0 | ------ |
| $K_2S_2O_8$ | 3.0 | 1.7 | ------ | 1.5 | 1.0 | ------ | 0.75 |
| $NaHSO_3$ | 1.0 | 0.6 | ------ | 0.5 | 0.5 | 0.8 | 0.37 |
| $FeSO_4 \cdot 7H_2O$ | ------ | ------ | 0.19 | ------ | ------ | 0.8 | ------ |
| $K_4P_2O_7$ | ------ | ------ | 0.21 | ------ | ------ | 0.85 | ------ |
| Polymerization, Temp., ° C | 60 | 60 | 60 | 50–60 | 55 | 70 | 60 |
| Polymerization, Time, Hrs | 22 | 22 | 12 | 40 | 16 | 6 | 16 |
| Conversion, percent | 100 | 46 | 100 | 40 | 94 | 56 | 92 |
| Total Solids, percent | [7] 41.6 | [7] 11.8 | 21.5 | 8 | 15.6 | 9.5 | 8.8 |

[1] Recipe A—300 pts. water, 10 pts. dodecylbenzene sodium sulfonate, 1 pt. diisopropyl benzenehydroperoxide, 0.21 pts. potassium pyrophosphate, 0.19 pts. $FeSO_4$—$7H_2O$, 0.075 pts. tert-dodecyl mercaptan.

[2] Conversion 100%, product filtered off and dried.

[3] Supplied by The Dow Chemical Co.

[4] 53% divinylbenzene concentrate containing 34.5% ethylvinylbenzene and 12.5% saturated hydrocarbon (chiefly diethylbenzene).

[5] Percent solids after centrifuging and filtering.

[6] Solids after freezing, thawing and filtering.

[7] Filtered and washed to give paste.

TABLE II.—VINYLIC FILLERS PER SE AND LUBRICANT COMPOSITIONS

| Example No. L-B- | 1 | 2 | 3 | 4 | 5 | 6 | 7 | 8 |
|---|---|---|---|---|---|---|---|---|
| Latex type example (see Table I) | A | B | C | D | E | E | E | E |
| Vinylic filler (dry basis) | 26 | 26.2 | 13.7 | 14.5 | 24.8 | 24.8 | 24.8 | 24.8 |
| Latex quantity | 100 | 100 | (3) | (3) | 100 | 100 | 100 | 100 |
| Water | | 100 | | | 100 | 200 | 200 | 200 |
| Additive | | | | | | | | |
| N-sec-butyl-p-phenylenediamine | 7 | | | | | | | |
| N-sec-octyl-p-phenylenediamine | | 7 | | | | | | |
| p,p'-Diamino-diphenyl methane | | | 2 | | | | | |
| Stearyl amine | | | | 2 | | | | |
| Sodium stearate | | | | | | 5 | | |
| Sodium ricinoleate | | | | | | | 10 | |
| Sodium dihydroxystearate | | | | | | | | 15 |
| Lubricant: | | | | | | | | |
| Lubricating oil, Quaker State SAE 40-50 [1] | 100 | 100 | 75 | 50 | 50 | | | |
| Lubricating oil, Permalube SAE 30 [2] | | | | | | 80 | 80 | 80 |
| Bis(m-phenoxyphenyl)ether | | | | | | | | |
| Blender mixing temp., ° C | 80 | 80 | 80 | 90 | 90 | 70 | 70 | 70 |
| Blender mixing time, minutes | 5 | 5 | 5 | 5 | 5 | 5 | 5 | 5 |
| Coagulant: | | | | | | | | |
| 10% Magnesium chloride solution | | 50 | | | | | | |
| 10% Stannous chloride solution | | | | | 50 | | | |
| 10% Calcium chloride solution | | | | | | | | |
| 10% Barium chloride solution | | | | | | | 100 | |
| 10% Lead nitrate solution | | | | | | | | 150 |
| 10% Aluminum chloride solution | | | | | | 75 | | |
| Filtered, water-washed and refiltered | | X | | | X | X | X | X |
| Oven dried, ° C | 80 | 80 | 80 | 80 | 80 | 80 | 80 | 80 |

| Example No. L-B- | 9 | 10 | 11 | 12 | 13 | 14 | 15 |
|---|---|---|---|---|---|---|---|
| Latex type example (see Table I) | F | G | G | G | H | I | G |
| Vinylic filler (dry basis) | 23.3 | 25.6 | 25.6 | 25.6 | 27.0 | 27.0 | 25.6 |
| Latex quantity | 100 | 100 | 100 | 100 | 100 | 100 | 100 |
| Water | 200 | 200 | 200 | 200 | | | |
| Additive | | | | | | | |
| N-sec-butyl-p-phenylenediamine | | | | | | | |
| N-sec-octyl-p-phenylenediamine | | | | | | | |
| p,p'-Diamino-diphenyl methane | | | | | | | |
| Stearyl amine | | | | | | | |
| Sodium stearate | | | | | 8 | | |
| Sodium ricinoleate | | | | | | | |
| Sodium dihydroxystearate | | | | | | | |
| Lubricant: | | | | | | | |
| Lubricating oil, Quaker State SAE 40-50 [1] | | | | | | | |
| Lubricating oil, Permalube SAE 30 [2] | 80 | 90 | 90 | 90 | 90 | 90 | |
| Bis(m-phenoxyphenyl)ether | | | | | | | 100 |
| Blender mixing temp., ° C | 80 | 80 | 80 | 80 | 80 | 80 | 80 |
| Blender mixing time, minutes | 5 | 5 | 5 | 5 | 5 | 5 | 5 |
| Coagulant: | | | | | | | |
| 10% Magnesium chloride solution | | | 50 | | | | |
| 10% Stannous chloride solution | | | | | | | |
| 10% Calcium chloride solution | 50 | | | 50 | | | |
| 10% Barium chloride solution | | | | | | | |
| 10% Lead nitrate solution | | | | | | | |
| 10% Aluminum chloride solution | | 50 | | | | | |
| Filtered, water-washed and refiltered | X | X | X | X | | | X |
| Oven dried, ° C | 80 | 80 | 80 | 80 | 80 | 80 | 100 |

[1] Quaker State Oil Refining Corp., Oil City, Pa.
[2] Standard Oil Co., Chicago, Ill.
[3] Dried vinylic filler was employed in L-B-3 and -4.

TABLE III.—VINYLIC FILLER LUBRICANT COMPOSITIONS

| Example No. L-C- | 1 | 2 | 3 | 4 | 5 | 6 | 7 | 8 | 9 |
|---|---|---|---|---|---|---|---|---|---|
| Vinylic Filler:* | | | | | | | | | |
| Vinylic filler type (see Table I) | G | G | G | H | H | H | I | I | I |
| Vinylic filler quantity (dry basis) | 30 | 30 | 30 | 30 | 30 | 20 | 30 | 10 | 30 |
| Lubricant:* | | | | | | | | | |
| (1) Mineral oil—Super Permalub SAE 10 W-30 (a) | 100 | | | | | | | | |
| (2) Synthetic lubricant—Polyisobutylene Indoil L-12 (b) | | 100 | | | | | | | |
| (3) Fatty oil—Castor oil | | | 100 | | | | | | |
| (4) Ester lubricant—Dioctyl phthalate | | | | 100 | | | | | |
| (5) Alcohol ester of inorganic acid—Tricresyl phosphate | | | | | 100 | | | | |
| (6) Polyoxyalkylene glycol—"Ucon" lubricant LB-300XY-26 (c) | | | | | | 100 | | | |
| (7) Sulphurized fatty oil—Sulphurized sperm oil (10% sulphur) | | | | | | | 100 | | |
| (8) Fluorocarbons—Fluorolub L.G. (d) | | | | | | | | 100 | |
| (9) Silicones—Dow Corning 550 Fluid (e) | | | | | | | | | 100 |

[a] Standard Oil Company, Chicago, Illinois.
[b] Indoil Chemical Company.
[c] Carbide and Chemical Corporation.
[d] Hooker Electrochemical Company.
[e] Dow-Corning Company.
*Vinylic filler and lubricant are blended and heated to 80° C. mixed in a high speed blender for 5 minutes, dried at 80° C. in air oven and heated to 150° C. with mechanical working.

*Example No. III–10*

A silicone-vinylic filler grease was made as follows: 160 pts. styrene, 40 pts. divinylbenzene (50%), 20 pts. hydroxystearic acid, 600 pts. water, 10 pts. aqueous ammonia, 2.5 pts. diisopropylbenzene-hydroperoxide in a capped bottle were polymerized 8 hours at 50° C. The bottle contents were added to a large Waring Blendor, 20 pts. of 28% aqueous ammonia added, then a mixture heated to 85° C. of 1600 pts. Dow Corning 550 silicone fluid and 80 pts. hydroxystearic acid was added. After mixing well there was added 16 pts. of lithium hydroxide monohydrate dissolved in 200 pts. boiling water. After agitating well there was added 800 pts. isopropanol and then 1400 pts. water at which point the silicone-vinylic filler grease separated. It was dried resulting in an excellent grease. (End of Example III–10.)

The compositions of Table II (except L–B–3 and 4) were prepared as indicated by blending the vinyl filler latex and lubricant oil together with other additives as shown in a high speed blender such as a Gaulin mixer (Manton-Gaulin Company) Waring Blendor, or a high-speed (10,000 to 18,000 r.p.m.) agitator mixer (e.g., that of R. C. Haskins Co., Chicago, Illinois), followed by addition of the coagulant. The aqueous serum was removed by filtration, the vinylic filler-oil composition was water-washed, refiltered and dried while working in a Baker-Perkins Mixer. L–B–3 and 4 were prepared by blending the dried filler with the oil in a Baker-Perkins Mixer.

The examples of Table III were prepared in a manner similar to the above procedure, but without the metal salt coagulant, the oil replacing the water medium around the particle by (1) mechanical equilibration while heating in a Waring Blendor followed by (2) drying while working in a heated (above 100° C.) Baker-Perkins Mixer.

Greases shown in Tables IV, V and VI were prepared by several methods as indicated. *The latex method* involved the blending of calculated amounts of lubricant and vinylic filler latices, and mixing in a Waring Blendor or in a Gaulin Mixer until the mixture gelled; if continued mixing did not result in serum separation isopropanol was added sufficient to coagulate the filler, the serum was decanted and the oil-filler coagula was worked in a Baker-Perkins Mixer at 110–150° C. until the water was completely removed. While drying can be accomplished by manually working the coagula with a paddle on a hot plate at 150° C., it was found much simpler to utilize a mechanical mixer such as the Baker-Perkins mixer.

*The paste or cake method* consisted of coagulation of the vinyl fillers from the latices with isopropanol, filtering, redispersing in water to wash them, and filtering. By this method the fillers were in the form of essentially emulsifier-free wet cakes or wet pastes depending on the type of vinylic fillers. The non-polar vinylic fillers furnished wet cakes while the polar fillers, particularly the halogenated vinylic fillers, the silane type vinylic fillers and the phosphonate-containing vinylic fillers formed pastes. The wet cake or paste was then blended with the lubricant in a Gaulin mixer, Waring Blendor or Baker-Perkins Mixer together with sufficient isopropanol to facilitate separation of most of remaining water as a separate serum phase, decantation of the serum, washing the filler-oil phase with water in the Waring Blendor, and drying in the Baker-Perkins mixer at 100 to 150° C. Equivalent results were accomplished by paddle-working small amounts at 150° C. on a hot plate and with a Baker-Perkins mixer on larger amounts.

*The solvent paste method* involved addition to carbon tetrachloride or toluene to the wet cake and pasting by working or agitating. The carbon tetrachloride was used when the vinylic filler was to be incorporated into a Fluorolube, while toluene was used when the filler was to be incorporated into a silicone oil.

*The suspension method* was useful, particularly with the vinyl-triethoxysilane vinylic fillers which gave unstable latices readily coagulating almost completely upon standing 24 hours. After 24 hours the coagulum was filtered and washed five times with water, then was redispersed in water (to 5 to 10% solids) for blending with the oil in a Waring Blendor. The mixture thickened and the oil-vinylic filler separated from the water serum. The water was separated by decantation and the grease was dried in the Baker-Perkins mixer at 100 to 150° C.

Broadly speaking, for a given vinylic filler and oil combination the consistency of the resultant grease (as measured by ASTM penetration) can be varied in a controlled manner by several procedures based on the type and amount of vinylic filler employed and the efficiency of dispersion of the vinylic filler in the oil. To make a "hard" grease i.e., one with a low penetration (say, below 100), a large amount of the vinylic filler (e.g., from 35 to 50% of the vinylic filler) in the grease is employed together with a high degree of mixing so that a smooth non-grainy film forms under pressure. If dispersion is carried only to a grainy texture (leaving some agglomerates of the vinylic filler in the grease) a softer grease is provided with the same amount of the same vinylic filler (i.e., 35 to 50%). On the other hand, a grease formed with 5 to 10% of the same vinylic filler results in a considerably softer product (penetration near 400).

Finally a grease of low vinylic filler content (e.g. 10%) with 300 penetration can be obtained if a polar vinylic filler is employed having a polar group matching the polar group of the oil, for example, a vinyltriethoxysilane vinylic filler with DC–550 silicone fluid, produces an effective grease of high thermal stability.

From the dropping points and penetrations shown in Tables IV to IX, it is apparent that greases of good consistency (i.e., penetrations) and high dropping points (>500° F.) were obtained by incorporation of vinylic fillers in lubricant oils, the amount and type vinylic filler incorporated determining the hardness and consistency of the resultant grease.

The thermal stability of the greases of most of the examples is limited by the stability of the oil rather than of the vinylic filler.

The high dropping points of the greases produced by the present invention result from the coaction between the fluid lubricant and the non-meltable colloidal sized vinylic filler particles; and if this coaction did not exist, then one would not obtain the elevated dropping points, and at elevated temperatures the fluid lubricant would separate from the filler material. Thus the stability limitation for preparing high temperature greases with my non-abrasive vinylic fillers is set by the lubricant oil rather than by the vinylic filler. The bis-phenoxyethers which are becoming available (Example L–B–15, Table II) have stability to withstand usage at 700° F. and higher and vinylic filler greases thus become immediately available for use at such temperatures.

Styrene/divinyl benzene and $CF_2{=}CCl_2$/divinyl-benzene vinylic fillers show good stability at 700° F. The use of triallyl cyanurate, diallyl maleate, tetrachlorodivinylbenzene and triacrylyltriazine also were demonstrated to give cross-linked styrene, vinyltriethoxysilane, and $CF_2{=}CCl_2$ fillers stable above 700° F. The diallylbenzene-phosphonate vinylic fillers do not appear to be quite as stable, greases incorporating them being limited to 600° F. usage. When high temperature stability is required stable emulsifiers such as the ammonium perfluorocaprylate emulsifier are preferred in making the vinylic filler latex; alternatively, soaps or sulfonates and like emulsifiers can be used, if during the preparation of the grease, the emulsifier is removed by washing.

Further tests run on the vinyl filler greases showed good oxidation stability; e.g., the Fluorolube and DC–550 grease containing cross-linked $CCl_2{=}CF_2$ and vinyltriethoxysilane respectively showed nil oxygen consumption when subjected to 110 p.s.i. oxygen at 302° F. for 100 hours.

TABLE IV.—HIGH TEMPERATURE VINYLIC FILLER LUBRICANT COMPOSITIONS—FLUOROLUBE HO-125 [a] OIL WITH VINYLIC FILLERS

| Example | 11 | 12 | 13 | | 14 | 15 | 16 |
|---|---|---|---|---|---|---|---|
| Code No | G–95C | G–95D | G–68–A | | G–79E | G–84–B | G–111–D |
| Method of Incorporation | Paste | Paste | Solvent Paste | | Solvent Paste | Solvent Paste | Solvent Paste |
| Wt. Percent Vinylic Filler in Fluorolube [a] | 16.7 | 10 | 5.0 | 5.7 | 13.3 | 16.7 | 8.3 |
| Filler Used (Table I) | Q | R | S | S | T | U | V |
| Grease Properties: | | | | | | | |
| Appearance [3] | Smooth | Smooth | | Slightly | Grainy | | Smooth |
| Dropping Point, ° F.[1] | 470 | <500 | 410 | 502 | 406 | 497 | <500 |
| Penetration [2] (unworked) | 314 | 303 | 264 | 226 | 353 | 291 | 253 |

| Example No | 17 | 18 | 19 | 20 | 21 | 22 |
|---|---|---|---|---|---|---|
| Code No | G–117 | G–75–D | G–93–C | G–100 | G–102 | G–276 |
| Method of Incorporation | Paste | Solvent Paste | Paste | Paste | Paste | Suspension |
| Wt. Percent Filler in Fluorolube Grease [a] | 8.7 | 7.7 | 27.3 | 20.0 | 7.1 | 13.1 |
| Filler Used (Table I) | X | Y | Z | AA | AB | AD |
| Grease Properties: | | | | | | |
| Appearance [3] | Smooth | Smooth | Smooth | Smooth | Smooth | Smooth |
| Dropping Point, ° F.[1] | <500 | 433 | <500 | 401 | 398 | 463 |
| Penetration [2] (Unworked) | 384 | 380 | 280 | 268 | 273 | 268 |

[a] Fluorolube HO-125 is essentially a linear polymer of molecular wt. about 950 built up of recurring unit (—CF²—CF—Cl—) and having a viscosity of 125±20 centipoises at 160° F.
[1] ASTM method D-566-42 was used to determine the dropping point.
[2] Miniature cone (¼ scale in comparison with ASTM method D-217-52T). Penetration (in tenths millimeter) = 3.85 $p$+22 where $p$ is the reading in millimeter/10 for the miniature cone. The readings were taken on a sample worked with a spatula on a glass plate just prior to testing. Method of Hotten and Kibler, Anal. Chem. 22, 1574 (1950) was used.
[3] Appearance denotes consistency of the grease film pressed out on a glass plate with a spatula.

TABLE V.—HIGH TEMPERATURE VINYLIC FILLER LUBRICANT COMPOSITIONS—SILICONE DC-550 OIL WITH VINYLIC FILLERS

| Example | 23 | 24 | 25 | 26 | 27 | 28 | 29 | 30 |
|---|---|---|---|---|---|---|---|---|
| Code No | G– | | | | | K–IV | | |
| | 44 | 47 | 114B | 117 | 75D | 293 | 291 | 281 |
| Method of Incorporation | Latex | Latex | Paste | Paste | Solvent Paste | Latex | Latex | Suspension |
| Wt. Percent Vinylic Filler in Grease | 20.1 | 12.3 10 | 21.8 | 20.5 | 22.2 | 21 | 23.6 | 13.3 |
| Filler Used (Table I) | L | L M | W | X | Y | AC | AE | AF |
| Other Additives (wt. percent): | | | | | | | | |
| Armeen HT (See Spec.) | 3.2 | 3.8 | ---------- | ---------- | ---------- | ---------- | ---------- | ---------- |
| Antioxidant BR-66[4] | 0.3 | 0.3 | ---------- | ---------- | ---------- | ---------- | ---------- | ---------- |
| Appearance [3] | Smooth | Smooth | Smooth | Smooth | Buttery | Smooth | Smooth | Smooth |
| Dropping Point, ° F.[1] | <500 | <500 | <500 | <500 | <500 | <500 | <500 | <500 |
| Penetration [2] | 375 | 333 | 253 | 282 | 252 | 269 | 291 | 322 |

S DC-550 Silicone Oil, a commercial Silicone product of the Dow-Corning Corp., has a viscosity of 100 to 150 centistokes at 77° F.
[1] Same as footnote (1), Table IV.
[2] Same as footnote (2), Table IV.
[3] Same as footnote (3), Table IV.
[4] BR-66 is N-cyclohexyl-N′-p-phenylenediamine made by Burke Research Co.

TABLE VI.—HIGH TEMPERATURE VINYLIC FILLER LUBRICANT COMPOSITIONS

| Example | 31 | 32 | 33 | 34 | 35 | 36 | 37 | 38 |
|---|---|---|---|---|---|---|---|---|
| Code No. G- | 95C | 95D | 53 | 60B | II467 | 48 | 38 | 60A |
| Method of Incorporation | Cake | Cake | Latex | Latex | Latex | Paste | Paste | Latex |
| Components, Percent: | | | | | | | | |
| Fluorolube S-30 [a] | 74.4 | 88.4 | | | | | | |
| Dioctyl sebacate | | | 61.6 | 59.4 | 80 | | | 59.5 |
| Nujol [b] | | | | | | 58.1 | | |
| Engine Oil (Standard Outboard Motor Oil) | | | | | | | 71.4 | |
| Vinylic Filler in Grease | 26.6 | 11.6 | 17.8 17.9 | 37.4 | 20 | 21.3 16.4 | 28.6 | 18.3 19.0 |
| Filler Used (Table I) | Q | R | [c]O [c]P | [c]K | AG | [c]L [c]M | N | [c]J [c]K |
| Other Additives (wt. percent): | | | | | | | | |
| Armeen T (See Text) | | | 2.4 | 3.2 | | | | 3.2 |
| Antioxidant BR-66 [4] | | | 0.3 | | | 0.3 | | |
| Armeen HT (See Text) | | | | | | 3.9 | | |
| Appearance [3] | Smooth | Smooth | Smooth | Hard Smooth | Smooth | Smooth | Smooth | Smooth Hard |
| Dropping Point, ° F. [1] | >500 | 405 | 490 | 351 | >500 | >500 | 440 | 257 |
| Penetration [2] | 266 | 306 | 474 | 64 | 320 | 336 | 268 | 100 |
| Flow Point, ° F | | | >400 | 250 | >400 | 300 | 300 | 150 |

[1 2 3] Same as footnotes of table IV.

[4] See Footnote 4 of Table V.

[a] Fluorolube S-30 is essentially a linear polymer of molecular weight about 775, formula $(CF_2CFCl)_x$, and viscosity 200±50 centipoises at 100° F.

[b] Nujol is a purified parraffinic oil (Stanco, Inc.).

[c] Ammonium hydroxystearate on vinylic filler was not washed off and is included in percent of vinylic filler shown.

It was found also that the greases retain desired consistences up to about 400° F.

Table VII shows typical data on the effect of temperature on softening (indicated by ASTM cone penetration in 0.1 mm. units) of vinylic filler grease preparations.

The penetrations desired are determined by intended usages. The National Lubricating Grease Institute recognizes 7 consistency grades or classifications as follows:

| Consistency number: | ASTM penetration at 77° F. worked 60 strokes in ASTM grease worker |
|---|---|
| 0 | 355–385 |
| 1 | 310–340 |
| 2 | 265–295 |
| 3 | 220–250 |
| 4 | 175–205 |
| 5 | 130–160 |
| 6 | 85–115 |

The consistency of the grease for a given application can be specified by the above grading system, and the amount of vinylic filler and type of vinylic filler to be used in making greases by the process of the present invention is determined thereby. The small particle size of the vinylic fillers (see my now abandoned copending applications S.N. 538,728 filed October 5, 1955, and S.N. 795,881 filed February 20, 1959) makes them efficient thickening agents for grease manufacture, the smaller the particle, the less vinylic filler being required. The control of the degree of dispersion of the vinylic filler agglomerates in the oil provides still another method of control of the grease consistency for a given amount of filler as mentioned hereinbefore, and likewise, the particle size of the vinylic filler can be controlled during the polymerization process of making them, e.g., by variation of the type and amount of emulsifier, the amount of water, etc. as described in said copending application, the higher emulsifier contents and the lower monomer contents in the polymerization system tending to produce smaller particle sizes.

TABLE VII.—EFFECT OF TEMPERATURE UPON PENETRATION† OF VARIOUS GREASES

| Vinylic Filler | | Vinylic Filler Grease | | | | | | | | | |
|---|---|---|---|---|---|---|---|---|---|---|---|
| | | Percent Filler in Base Lubricant | | | | Penetration at Temperature, ° F. | | | | | |
| | | Fluorolube | | DC-550 | | | | | | | |
| Code G- | Composition* | HO-125 | S-30 | Fluid | 77° F. Original Worked‡ Penetration | 77 | 212 | 302 | 392 | Cooled to 77° F. | Cooled to 77° F. and worked with Spatula |
| 117 | VTS/DVB (80/20) | 8.7 | | | 344 | 407 | 463 | | | 322 | 336 |
| | VTS/DVB (80/20) | | | 20.5 | 268 | 210 | 214 | 256 | 272 | | |
| | VTS/DVB (80/20) | | | 14.1 | 365 | 365 | 342 | 302 | 276 | 194 | 368 |
| 107A | VTS/DVB (80/20) | 8.0 | | | 284 | 272 | 330 | 326 | 245 | 110 | 318 |
| | VTS/DVB (80/20) | | | 16.7 | 244 | 156 | 229 | 191 | 235 | 99 | 238 |
| 95C | $CF_2=CFCl$/DVB (80/20) | 16.7 | | | 314 | | 310 | 284 | | 210 | 300 |
| | $CF_2=CFCl$/DVB (80/20) | | 25.6 | | 266 | 236 | 270 | 210 | | 118 | 252 |
| Reference Greases (Commercial) (Recommended for maximum 350° F. usage): | | | | | | | | | | | |
| Grease No. I | | | | | 322 | 326 | 343 | Oil separation | | | 355 |
| Grease No. II | | | | | 240 | 285 | 294 | 299 | | | 168 |

*VTS=vinyltriethoxysilane.
DVB=divinylbenzene (53% concentration).
$CF_2=CCl_2$=difluoroduchloroethylene.
†Penetrations measured by ASTM method modified according to Hotten and Kibler, Anal. Chem. 22, 1574 (1950).
‡60 double strokes in NRL micro-grease worker using 150 mesh screen, just prior to the penetration measurement.

Likewise, penetrations obtained on shelf aging and after working show that the vinylic filler greases have good shelf life and shear or work stability. All the greases exemplified herein show little change in consistency over a period of a month of observation in storage. One exception is the DC-550 greases which showed a decreased penetration reading about 100 lower than the originals, but were still of adequate grease consistency after working with the spatula. The shear or work stability was established by use of the Naval Research Laboratory Micro-Grease Worker.

The water resistance of the greases prepared were determined to be adequate as judged by a 24-hour test of greased panels in water at 140° F. (Table VIII).

Table IX shows that copper corrosion resistance is adequate for use of the vinylic filler greases in high temperature bearings.

TABLE VIII.—EMULSIFICATION OR WATER RESISTANCE TEST OF VINYLIC FILLER GREASES

| Code | Filler* | DC-550 Fluid | Fluorolube Oils | | Penetration | D.P., ° F. | Grease Film Appearance After Immersion in Distilled Water for 24 Hours at 60° C. Compared to Reference Grease II |
|---|---|---|---|---|---|---|---|
| | | | HO-125 | S-30 | | | |
| G-107A | VTS/DVB (50%) 80/20 | 16.6 | | | 354 | >500 | Pass |
| G-107A | VTS/DVB (50%) 80/20 | | 8.0 | | 284 | >500 | Pass |
| G-117 | VTS/DVB (50%) 80/20 | 20.5 | | | 282 | >500 | Pass |
| G-127 | VTS/DVB (50%) 80/20 | 20.0 | | | 260 | >500 | Pass |
| G-129 | VTS/DVB (50%) 80/20 | 20.0 | | | 228 | >500 | Pass |
| G-118A | VTS/DVB (50%) 80/20 | 12.5 | | | 186 | >500 | Pass |
| G-123 | VTS/DVB (50%) 80/20 | 10.0 | | | 312 | >500 | Pass |
| G-95D | $CCl_2=CF_2$/DVB (53%) 80/20 | 18.5 | | | 264 | >500 | Pass |
| | $CCl_2=CF_2$/DVB (53%) 80/20 | | 10.0 | | 303 | >500 | Pass |
| | $CCl_2=CF_2$/DVB (53%) 80/20 | | | 11.6 | 306 | 405 | Pass |
| | $CCl_2=CF_2$/DVB (53%) 80/20 | | 16.7 | | 314 | 470 | Pass |
| Reference Commercial Greases: | | | | | | | |
| Grease II | | | | | 226 | 430 | Pass |
| Grease I | | | | | 291 | 426 | Pass |

*See Table VII footnote for meaning of abbreviations.

TABLE IX.—COPPER CORROSION EFFECTS OF VINYLIC FILLER GREASES (DC-550 FLUID AND FLUOROLUBE OIL LUBRICANTS)

| Code | Filler* | Percent Filler in | | | Penetration | D.P., ° F. | Observations (according to Method 5309.2)** | | |
|---|---|---|---|---|---|---|---|---|---|
| | | DC-550 Fluid | Fluorolube Oils | | | | 3.1 Darkening | 3.2 Etching Staining, Etc. | 3.3 Contact Green Color |
| | | | HO-125 | S-30 | | | | | |
| G-107A | VTS/DVB (50%) 80/20 | 16.6 | | | 352 | >500 | None | None | None. |
| G-107A | VTS/DVB (50%) 80/20 | | 8.0 | | 284 | | Slight | do | Do. |
| 117 | VTS/DVB (50%) 80/20 | 20.5 | | | 282 | >500 | None | do | Do. |
| 124 | VTS/DVB (50%) 80/20 | 22.0 | | | 260 | >500 | do | do | Do. |
| 125 | VTS/DVB (50%) 80/20 | 20.0 | | | 260 | <240 | do | do | Do. |
| 118-II | VTS/DVB (50%) 80/20 | 20.0 | | | 332 | <260 | do | Slight | Do. |
| 127 | VTS/DVB (50%) 80/20 | 20.0 | | | 260 | >500 | do | do | Do. |
| 129 | VTS/DVB (50%) 80/20 | 20.0 | | | 228 | >500 | do | None | Do. |
| 118A | VTS/DVB (50%) 80/20 | 12.5 | | | 186 | >500 | do | Slight | Positive. |
| 118-II | VTS/DVB (50%) 80/20 | 20.0 | | | 332 | <200 | do | None | None. |
| 123 | VTS/DVB (50%) 80/20 | 10.0 | | | 312 | >500 | do | Slight | Do. |
| 95D | $CCl_2—CF_2$/DVB (50%) 80/20 | 18.5 | | | 264 | >500 | do | None | Do. |
| | $CCl_2—CF_2$/DVB (50%) 80/20 | | 10.0 | | 303 | >500 | do | Slight | Do. |
| | $CCl_2—CF_2$/DVB (50%) 80/20 | | | 11.6 | 306 | 405 | do | do | Do. |
| 95C | $CCl_2—CF_2$/DVB (50%) 80/20 | | 16.7 | | 314 | 470 | do | do | Do. |
| | $CCl_2—CF_2$/DVB (50%) 80/20 | | | 25.6 | 266 | >500 | Line at interface. | do | Do. |
| Commercial Reference Samples: | | | | | | | | | |
| Grease II | | | | | 226 | 430 | None | None | Do. |
| Grease I | | | | | 291 | 426 | do | Slight | Do. |

*See footnotes Table VII for abbreviations.
**Federal Test Method Standard.

Thus, vinylic filler lubricant materials and compositions are provided by the present invention for industrial usages and by variation of type and amount of filler and by particle size of vinylic fillers, are provided to conform to any specifications that have been set for each usage, such specifications, for example, as: (1) consistency, (2) viscosity, (3) flow, (4) shear stability, (5) dropping point, (6) thermal stability, (7) bleeding, (8) water resistance, (9) corrosion protection, (10) antiwear properties, (11) extreme pressure qualities, (12) break-away torque, (13) chemical stability (oxidation), and (14) engine tests.

The last test (14) is considered to be the most important test because the actual performance in the engine bearing tests is an indication of the true value of the grease while the other thirteen tests are secondary tests important for predicting performance.

Accordingly five larger batches of grease were prepared and tested in an engine bearing test at 300° F. and 350° F. at 10,000 r.p.m. (Table X).

TABLE X.—ENGINE BEARING TESTS OF VINYLIC FILLER GREASES

| | OWB-III | BJ-II | OWB-III | N-IV | N-IV |
|---|---|---|---|---|---|
| Grease No. | 283 | 161 | 296 | 291 | 281 |
| Composition, Wt. percent: | | | | | |
| DC-550 Fluid | 76 | 79.7 | 84.6 | 76.4 | 86.6 |
| Vinylic Filler: | 18.2 | 14.5 | 9.9 | 23.6 | 13.4 |
| Styrene, percent | 80 | 80 | 80 | 80 | ------ |
| Divinylbenzene,* percent | 20 | 20 | 20 | 20 | 20 |
| Vinyltriethoxy-silane, percent | ------ | ------ | ------ | ------ | 80 |
| Hydroxystearic Acid, percent | ------ | ------ | 0.2 | ------ | ------ |
| Lithium hydroxy stearate, percent | 5.8 | 5.8 | 5.3 | ------ | ------ |
| Min. Mixing | 15 | 60 | 10 | ------ | ------ |
| Penetration (mm./10) | 283 | 259 | 367 | 291 | 322 |
| Dropping Point, ° F. | >500 | >500 | >450 | >500 | >500 |
| Apparent Viscosity, Poises: | | | | | |
| 10 $sec.^{-1}$ | 1,100 | ------ | ------ | ------ | ------ |
| 100 $sec.^{-1}$ | 250 | ------ | ------ | ------ | ------ |
| Temp. of Bearing Test, ° F. | 300 | 300 | 300 | 350 450 | 350 450 |
| Time of Hours to Failure | 704 | 1,397 | 2,343 | 619 140 | 536 322 |
| Reference Grease III | 700 | 700 | 700 | ------ | ------ |
| Reference Grease II | ------ | ------ | ------ | 330 55 | 330 55 |

*53% divinylbenzene, 34.5% ethylvinylbenzene, 125% chiefly diethylbenzene.

By the present invention new vinylic filler lubricant compositions are provided wherein a non-abrasive organic material, i.e., the vinylic filler, is employed to thicken the many known lubricating oils, commercially available to produce greases.

While there have been described herein what are at present considered preferred embodiments of the invention, it will be obvious to those skilled in the art that minor modifications and changes may be made without departing from the essence of the invention. It is therefore to be understood that the exemplary embodiments are illustrative and not restrictive to the invention, the scope of which is defined in the appended claims and that all modifications that come within the meaning and ranges of equivalency of the claims are intended to be included therein.

I claim:

1. A lubricating composition comprising in combination:

(a) 100 parts of fluid lubricant by weight, and (b) from 5 to 100 parts of vinylic filler material by weight;

(c) said vinylic filler material being made up essentially of polymer particles in the colloidal size range of about 5 millimicrons to about 0.5 micron average diameter; said particles being three-dimensionally cross-linked so that each particle is non-meltable and non-soluble in any solvent that does not break down its primary chain structure; said particles having been prepared by cross-linking polymerization, in aqueous dispersion, of monomer material polymerizable therein and selected from the class consisting of the polymerizable monomers containing at least one carbon-to-carbon unsaturated group with the further limitation that the selected monomer material comprises cross-linking monomer material containing a plurality of such carbon-to-carbon unsaturated groups in at least a sufficient amount to effect, in said cross-linking polymerization, enough cross-linking within particles to render them non-soluble as aforesaid.

2. A lubricating composition as claimed in claim 1 in which the non-meltable vinylic filler particles comprise acidic groups in metal salt form.

3. A lubricating composition as claimed in claim 1 in which the non-meltable vinylic filler particles comprise acidic groups in alkali metal salt form.

4. A lubricating composition as claimed in claim 1 in which the non-meltable vinylic filler particles comprise acidic groups in alkali metal salt form and acidic groups in the form of salt of a metal of groups II through VIII of the periodic table.

5. A lubricating composition as claimed in claim 1 in which the non-meltable vinylic filler particles comprise acidic groups in the form of salt of a metal of groups II through VIII of the periodic table.

6. A lubricating composition as claimed in claim 1 in which the non-meltable vinylic filler has a metallic soap on surfaces of its particles.

7. A lubricating composition as claimed in claim 1 in which the fluid lubricant is a petroleum lubricating oil.

8. A lubricating composition as claimed in claim 1 in which the fluid lubricant is an ester lubricating oil.

9. A lubricating composition as claimed in claim 1 in which the fluid lubricant is a polyoxyalkylene lubricating oil.

10. A lubricating composition as claimed in claim 1 in which the fluid lubricant is a silicone lubricating oil.

11. A lubricating composition as claimed in claim 1 in which the fluid lubricant is a fluorine containing lubricating oil.

12. A lubricating composition as claimed in claim 1 in which the fluid lubricant is selected from the class consisting of (1) a polyphenoxyether represented by the formula $C_6H_5(O-C_6H_4)_nOC_6H_5$ wherein $n=1$ to 5, (2) a fluorinated hydrocarbon, (3) a silicone lubricating oil, and (4) a fluorinated ester of a carboxylic acid.

References Cited by the Examiner

UNITED STATES PATENTS 2,698,297 12/1954 Giammaria ---------- 252—39

OTHER REFERENCES

"Styrene, Its Polymers, Copolymers and Derivatives," by Boundy-Boyer, Reinhold Pub. Corp., New York, 1952, pages 674, 675 and 879.

DANIEL E. WYMAN, *Primary Examiner.*

I. VAUGHN, *Assistant Examiner.*